United States Patent
Park et al.

(10) Patent No.: US 11,593,661 B2
(45) Date of Patent: Feb. 28, 2023

(54) FEW-SHOT TRAINING OF A NEURAL NETWORK

(71) Applicant: NVIDIA Corporation, Santa Clara, CA (US)

(72) Inventors: Seonwook Park, Zurich (CH); Shalini De Mello, San Francisco, CA (US); Pavlo Molchanov, Mountain View, CA (US); Umar Iqbal, San Jose, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 684 days.

(21) Appl. No.: 16/389,832

(22) Filed: Apr. 19, 2019

(65) Prior Publication Data

US 2020/0334543 A1    Oct. 22, 2020

(51) Int. Cl.
*G06N 3/08*      (2006.01)
*G06F 7/57*      (2006.01)
*G06F 17/18*     (2006.01)
*G06N 3/04*      (2006.01)
*G06N 3/088*     (2023.01)

(52) U.S. Cl.
CPC ............... *G06N 3/088* (2013.01); *G06F 7/57* (2013.01); *G06F 17/18* (2013.01); *G06N 3/0454* (2013.01); *G06N 3/0472* (2013.01)

(58) Field of Classification Search
CPC .... G06N 3/088; G06N 3/0454; G06N 3/0472; G06F 7/57; G06F 17/18
See application file for complete search history.

(56) References Cited

U.S. PATENT DOCUMENTS

| | | | |
|---|---|---|---|
| 2019/0102528 A1* | 4/2019 | Beacham | G06K 9/00255 |
| 2020/0026965 A1* | 1/2020 | Guo | G06N 3/0454 |
| 2020/0082198 A1* | 3/2020 | Yao | G06K 9/00986 |
| 2020/0082264 A1* | 3/2020 | Guo | G06N 3/08 |
| 2021/0374987 A1* | 12/2021 | Ma | G06N 3/08 |

OTHER PUBLICATIONS

Su et al., Render for CNN: Viewpoint Estimation in Images Using CNNs Trained With Redered 3D Model Views, IEEE International Conference On Computer Vision, 2015 (Year: 2015).*
Article 67(3) EPC Communication dated Sep. 30, 2020, European Patent Application No. 20168957.7, 2 pages.
Communication Pursuant to Rule 69 EPC, dated Nov. 2, 2020, European Patent Application No. 20168957.7, 2 pages.
Extended European Search Report dated Sep. 28, 2020, European Patent Application No. 20168957.7, 10 pages.

(Continued)

*Primary Examiner* — Raymond L Nimox
(74) *Attorney, Agent, or Firm* — Davis Wright Tremaine LLP

(57) ABSTRACT

A neural network is trained to identify one or more features of an image. The neural network is trained using a small number of original images, from which a plurality of additional images are derived. The additional images generated by rotating and decoding embeddings of the image in a latent space generated by an autoencoder. The images generated by the rotation and decoding exhibit changes to a feature that is in proportion to the amount of rotation.

29 Claims, 10 Drawing Sheets

(56) References Cited

OTHER PUBLICATIONS

IEEE Computer Society, "IEEE Standard 754-2008 (Revision of IEEE Standard 754-1985): IEEE Standard for Floating-Point Arithmetic," The Institute of Electrical and Electronics Engineers, Inc., Aug. 29, 2008, 70 pages.

Park et al., "Few-Shot Adaptive Gaze Estimation," 2019 IEEE/CVF International Conference on Computer Vision (ICCV), Oct. 27, 2019, 10 pages.

Su et al., "Render for CNN: Viewpoint Estimation in Images Using CNNs Trained with Rendered 3D Model Views," 2015 IEEE International Conference on Computer Vision (ICCV), Dec. 7, 2015, 10 pages.

Tseng et al., "Few-Shot Viewpoint Estimation," May 13, 2019, retrieved Jan. 5, 2021 from https://arxiv.org/pdf/1905.04957.pdf, 10 pages.

* cited by examiner

FEW-SHOT TRAINING OF A NEURAL NETWORK

BACKGROUND

Few-shot learning is a training technique for neural networks which may be useful when it is difficult to obtain a sufficient quantity of training samples. Few-shot learning has been applied to classification problems in which a neural network is trained to categorize objects. However, few-shot learning has not typically been applied to solve regression problems. One such problem relates to estimating, from an input image comprising a representation of a person, a direction of the person's gaze.

DETAILED DESCRIPTION

Figure 1:
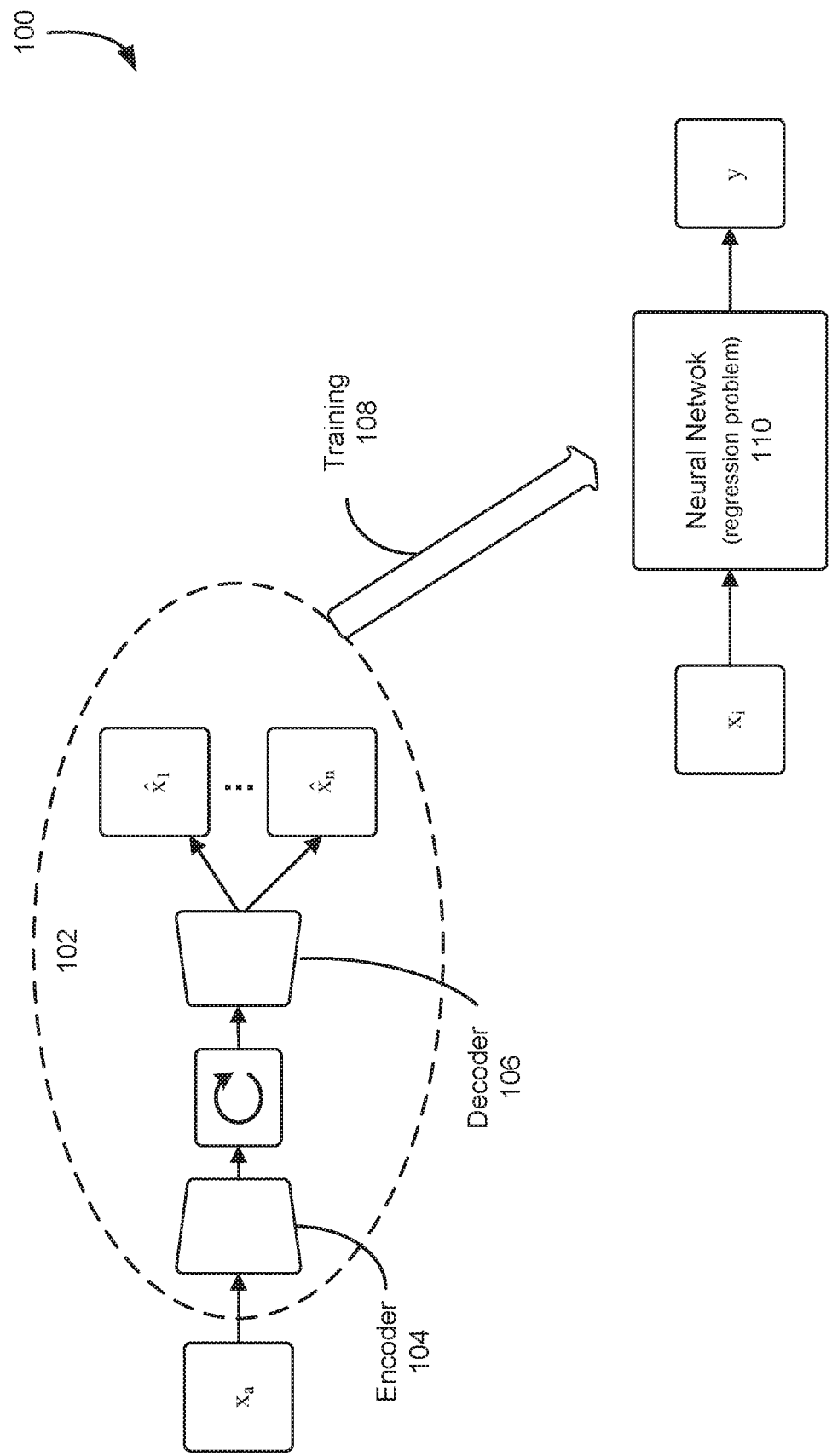
FIG. 1 illustrates few-shot training for a regression problem, in accordance with an embodiment.

Described herein are embodiments of processors, systems, methods, and computer program products for training a one or more neural networks to identify features in an image. In an example embodiment, a processor is configured to identify one or more features within an image based on a neural network trained using images generated from encoded and rotated points in one or more equivariant latent spaces. The identified features may comprise a numerical estimate calculated, by the neural network, as the solution to a regression problem.

In an embodiment, a neural network is trained to solve a regression problem using few-shot learning. As used herein, few-shot learning involves training a neural network to solve a regression problem using a relatively small training set. As an example of a regression problem, consider training a neural network to determine where a person is looking. This may be referred to as view direction, and may be viewed as a composite of gaze direction, which is sometimes referred to as gaze angle, head rotation, and possibly other factors. To estimate view direction, a neural network may be trained to estimate, based on an image of the individual, the angle of a person's gaze, the angle of the person's head rotation, and so forth. These estimations may also be referred to as predictions. Regression problems may typically require large training sets, including examples covering the entire range of possible values. The collection of such training sets may be difficult, however, particularly in cases where accuracy of the solution requires individualized training. For example, regarding the eye gaze problem, various differences in physical anatomy make generalized solutions difficult. To improve accuracy, training may be individualized, but the collection of such training sets from the end user may be problematic. However, in embodiments described herein, a few-shot training process may be applied to solve these and other regression problems. For example, embodiments of the techniques described herein may have applicability to medical diagnostics, audio, or other applications that involve training of a neural network with respect to features or characteristics of a particular individual.

In an embodiment, a neural network is trained to solve a regression problem based on training images generated by an autoencoder trained to embed images in an equivariant latent space. The generated images may sometimes be referred to as hallucinated training images, because they are artificially generated. Here, the training images can be based on a relatively small number of original, or real, images. In cases and embodiments, as few as one real image is used. The hallucinated images are generated by training an autoencoder to generate training images in which a property of interest, such as gaze direction, varies continuously across a range of values.

In an embodiment, a neural network is trained to solve a regression problem based on codes generated by an autoencoder trained to embed images in an equivariant latent space. This original code may be rotated to produce variants of the original code. The neural network can then be trained to solve the regression problem using these variants.

In an embodiment, an auto-encoder is taught to embed features of an image into one or more equivariant latent spaces. As used herein, an equivariant latent space has the following property: If an embedding of an image in the equivariant latent space is rotated by an amount r, a decoding of the rotated embedding will generate an image in which a property of interest has changed in an amount proportional to r.

FIG. 1 illustrates few-shot training for a regression problem, in accordance with an embodiment. In the example 100 of FIG. 1, an autoencoder 102 generates variant images or variant codes for use in a training process 108.

In an embodiment, an autoencoder 102 is pre-trained to embed an input image $x_a$ into a latent space that is equivariant around a property of interest. The autoencoder 102 may comprises an encoder 104 and a decoder 106. Aspects of training the autoencoder are discussed in more detail herein, including with regards to FIG. 4.

In an embodiment, the input image $x_a$ is one of a relatively small number of images collected in a few-shot training process. The input image $x_a$ is collected so that a corresponding value of the property of interest, as exhibited in the image $x_a$, is known. Once collected, the encoder 104 embeds the image $x_a$ into the equivariant space. The embedding is then rotated and decoded a number of times to generate the hallucinated images $\hat{x}_1 \ldots \hat{x}_n$. The hallucinated images exhibit a wide range of values for the property of interest. In embodiments, the process of rotation and decoding is such that images $\hat{x}_1 \ldots \hat{x}_n$ exhibit values of the property of interest across a desired range, with sufficient granularity for use in training a neural network to solve a regression problem. In cases and embodiments, each iteration of the rotation and decoding comprises an amount of rotation selected to result in sufficiently fine-grained differences, in the hallucinated images, to effectively train the network. Note that although the example 100 depicts the use of a single input image $x_a$, embodiments may employ a greater number of images. For example, in an embodiment, a 360° range for a property of interest is obtained by collecting one "real" image for each 90° quadrant. This example is intended to be illustrative of potential embodiments, rather than limiting, and as such should not be construed so as to limit the scope of the present disclosure to only those embodiments which include the specific example provided.

In an embodiment, the hallucinated images $\hat{x}_1 \ldots \hat{x}_n$ each exhibit a value for the property of interest that is, at least approximately, proportional to the degree of rotation in the equivariant latent space. This allows each of the images $\hat{x}_1 \ldots \hat{x}_n$ to be labeled with a corresponding property value, for use during draining. Labelling for an image is, in embodiments, updated and preserved for each rotation, and retained for use in subsequent training of a neural network.

In an embodiment, the hallucinated images $\hat{x}_1 \ldots \hat{x}_n$ are used in a training process 108 to train a neural network 110 to solve a regression problem. For example, the neural network 110 may be trained to generate an output, y, comprising an estimated value of a property exhibited by an input image z. The neural network 110 may comprise any of a wide variety of neural network architectures, and any of a variety of training techniques may be employed, as appropriate given the selected network architecture and the available set of generated images.

In an embodiment, instead of or in addition to generating the hallucinated images $\hat{x}_1 \ldots \hat{x}_n$, the neural network 110 is trained using codes generated by rotation of an embedding in the equivariant latent space. For example, the neural network 110 may be trained to generate the output, y, comprising an estimated value of a property exhibited by an input image $x_i$, based on codes generated by embedding one or more properties of $x_a$ into a latent space and rotating the embeddings.

Figure 2:
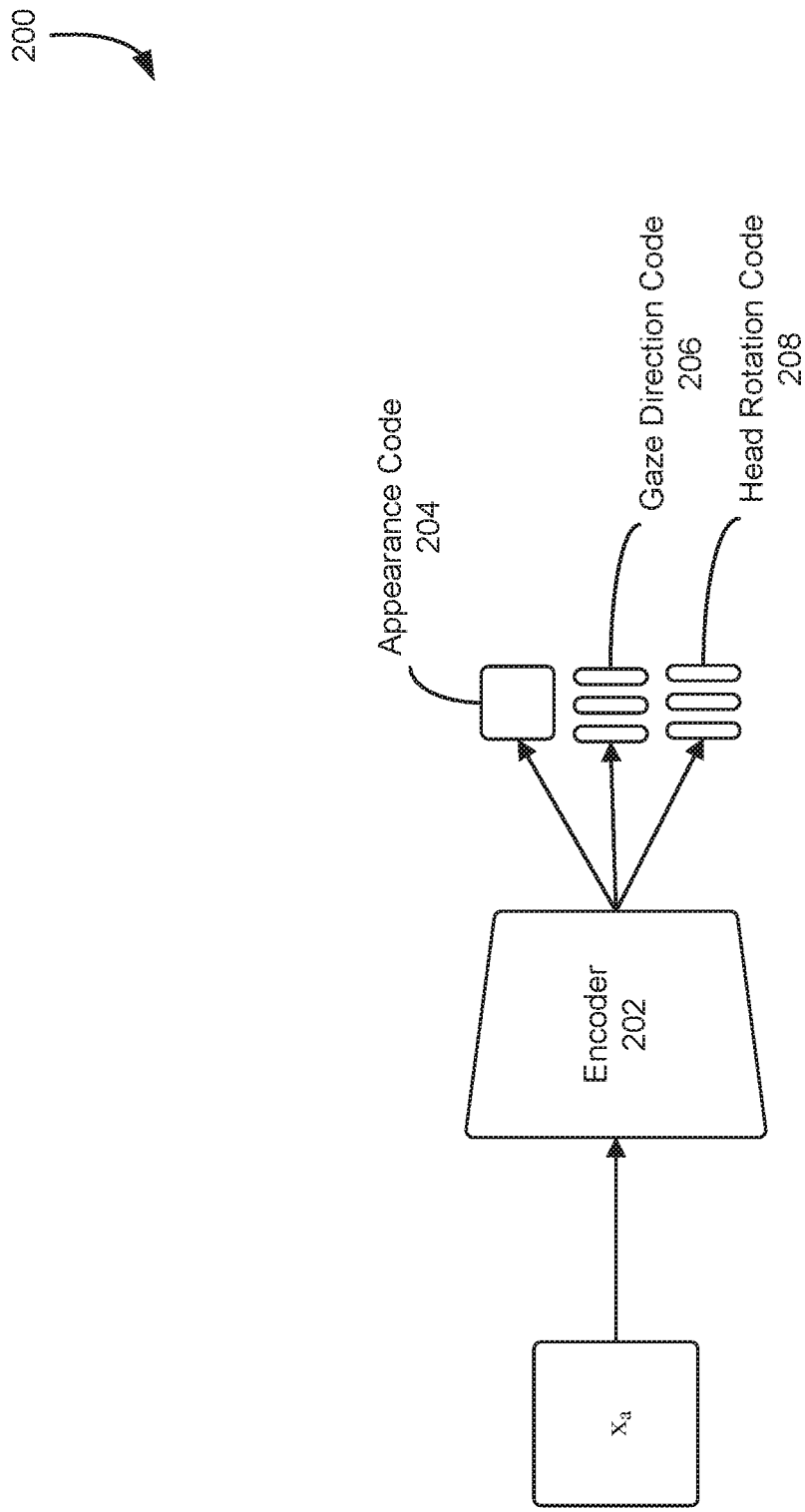
FIG. 2 illustrates an example of an encoder portion of an autoencoder, in accordance with an embodiment.

FIG. 2 illustrates an example of an encoder portion of an autoencoder, in accordance with an embodiment. In particular, the example 200 illustrates an autoencoder directed to the problem of estimating the direction an individual is looking. It will be appreciated that the example 200 is provided to illustrate various aspects of potential embodiments of the present disclosure, and as such should not be construed in a manner which would limit the scope of the present disclosure to only those embodiments which include the specific example provided.

In an embodiment, one or more autoencoders are trained to generate equivariant latent spaces for properties relevant to the eye gaze problem. Note that while FIG. 2 depicts a single encoder 202, embodiments may use one or more than one encoder similar to the depicted encoder 202.

In an embodiment, an image $x_a$ is provided to the encoder 202, or to one or more such encoders, which then embed the image $x_a$ into one or more equivariant latent spaces. In embodiments, the encoder 202 also generates one or more non-equivariant latent spaces.

In an embodiment, the encoder 202 generate an appearance code 204, a gaze direction code 206, and a head rotation code 208. The appearance code 204 is indicative of various aspects of the appearance of the subject depicted in the image $x_a$. The gaze direction code 206 is indicative of orientation of the subject's eyes, although in some embodiments each eye may be coded separately. The head rotation code 208 is indicative of the orientation of the subject's head.

In an embodiment, the encoder 202 embeds the gaze direction code 206 and the head rotation code 208 in one or more equivariant latent spaces. For example, in the depicted embodiment, the encoder 202 maps the gaze direction code 206 to a point in a latent space such that, if the point is rotated by a some amount r, an image generated by decoding the rotated point exhibits a change to the property of interest, in this case gaze direction, that is proportional to r. Likewise, the encoder 202 maps the head rotation code 208 to a point in a latent space such that, if the point is rotated by r, an image generated by decoding the rotated point exhibits a change in head rotation proportional to r.

In an embodiment, the equivariant latent spaces are three-dimensional latent spaces. In order to rotate a point in the equivariant latent space, an embedding in that space is multiplied by a three-dimensional rotation matrix. The resulting point, because the latent space is equivariant, preserves the property of interest and can be decoded to generate an image in which the preserved property has been rotated by a proportional amount.

Figure 3:
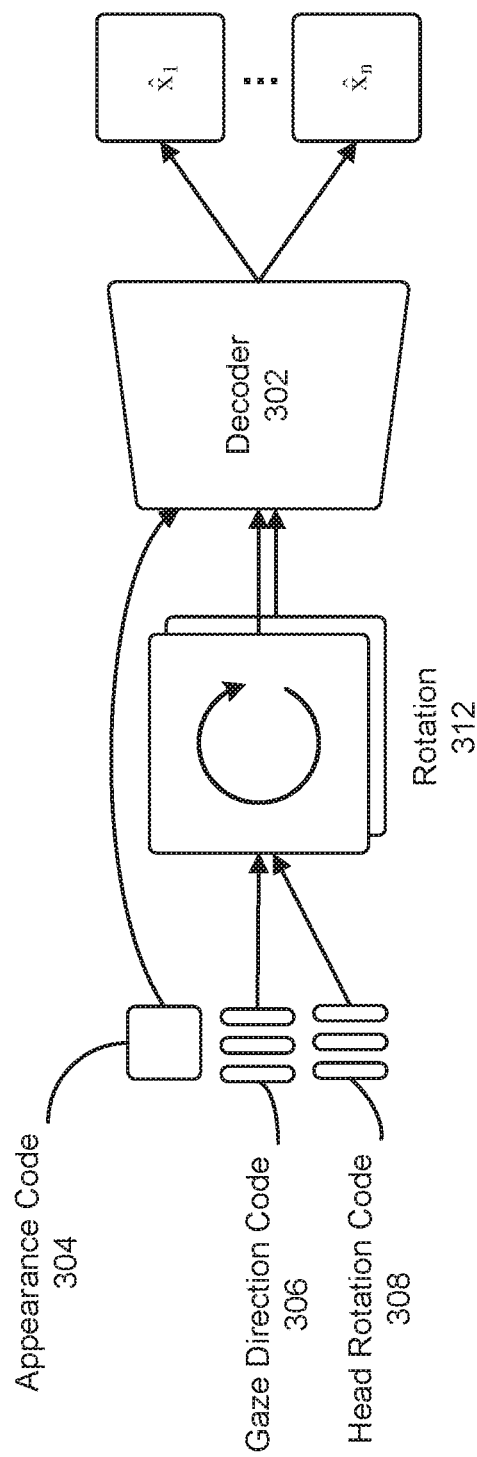
FIG. 3 illustrates an example of a rotation and decoding portion of an autoencoder, in accordance with an embodiment.

FIG. 3 illustrates an example of a rotation and decoding portion of a rotating autoencoder, in accordance with an embodiment. The example 300 of FIG. 3 pertains to the decoder portion of the autoencoder depicted in FIG. 2, and relates to the same problem of estimating the direction and individual is looking. It will therefore be appreciated that the example 300 is also provided to illustrate various aspects of potential embodiments of the present disclosure, and as such should not be construed in a manner which would limit the scope of the present disclosure to only those embodiments which include the specific example provided.

In an embodiment, the gaze direction code 306 and head rotation code 308, which correspond to those depicted in FIG. 2, are rotated by a rotation 312. The rotation process 312 may comprise a process of applying one or more three-dimensional rotation matrices to the codes 306, 308 output by the encoder.

In an embodiment, the codes 306, 308 are rotated independently. For example, the gaze direction code 306 might be rotated 15°, and the head rotation code 308 might be rotated 4°. The rotation may, in these and other instances, be described as disentangled, because in these and other embodiments, a feature represented by a code can be rotated independently without significantly affecting other features.

In an embodiment, the appearance code 304 is not rotated. For example, one of the images $\hat{x}_1 \ldots \hat{x}_n$ may be generated by decoding the rotated code 306, 308, and the un-rotated appearance code 304.

In an embodiment, the appearance code 304, gaze direction code 306, and head rotation code 308 are rotated and then decoded by the decoder 302. A rotation and decoding might then generate one of the output images $\hat{x}_1 \ldots \hat{x}_n$. Each of the images $\hat{x}_1 \ldots \hat{x}_n$ may exhibit the same appearance as the subject of the input image $x_a$, with different gaze directions and/or head rotations. The images generated by this rotation and decoding may then be used to train a neural network to solve a regression problem, based on data generated through multiple rotations.

In an embodiment, a rotated appearance code 304 or head rotation code 308 is used to training a neural network to solve a regression problem, instead of or in addition to generating the images $\hat{x}_1 \ldots \hat{x}_n$ and using these images for training.

Figure 4:
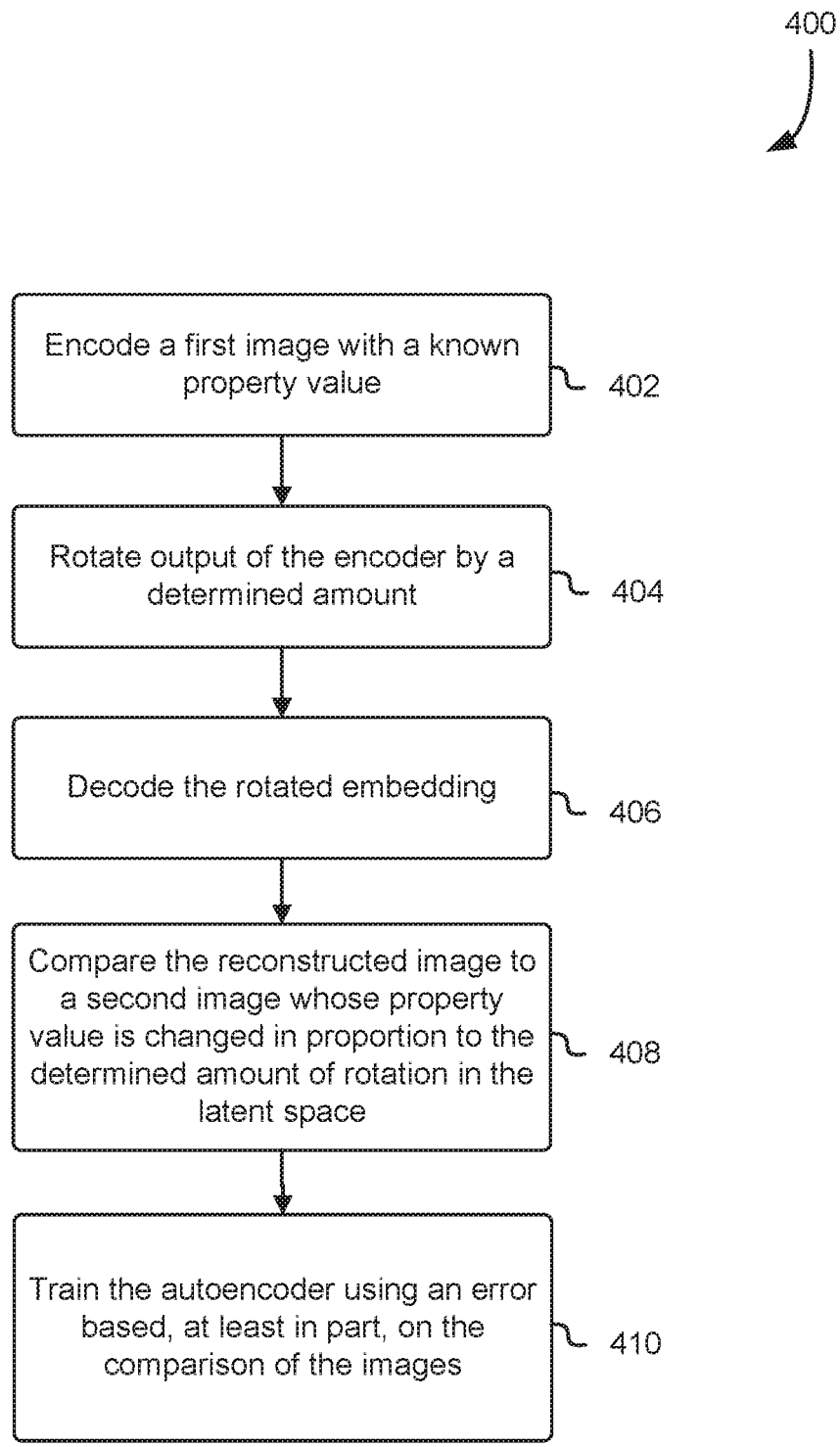
FIG. 4 illustrates an example process for training an autoencoder, in accordance with an embodiment.

FIG. 4 illustrates an example process for training an autoencoder, in accordance with an embodiment. Although depicted as a series of operation, the depicted order should not be construed so as to limit the scope of the present disclosure to only those embodiments which conform to the depicted order. For example, in certain cases, the depicted operations may be performed in an order that is different than what is depicted, or performed in parallel, except where the order may be logically required. In some embodiments, certain of the depicted operations may be omitted.

Figure 6:
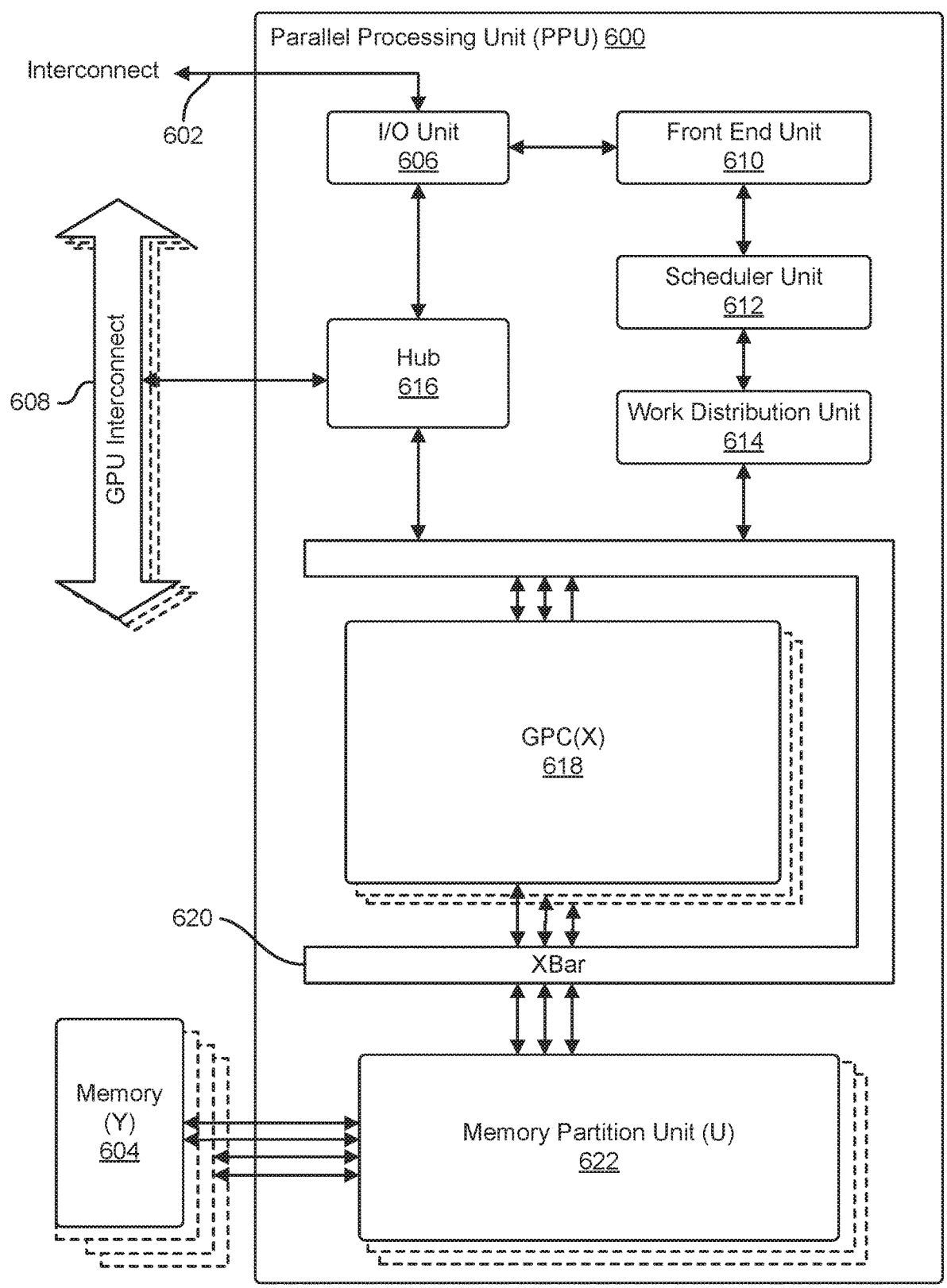
FIG. 6 illustrates an example of parallel processing unit ("PPU"), in accordance with an embodiment.
Figure 7:
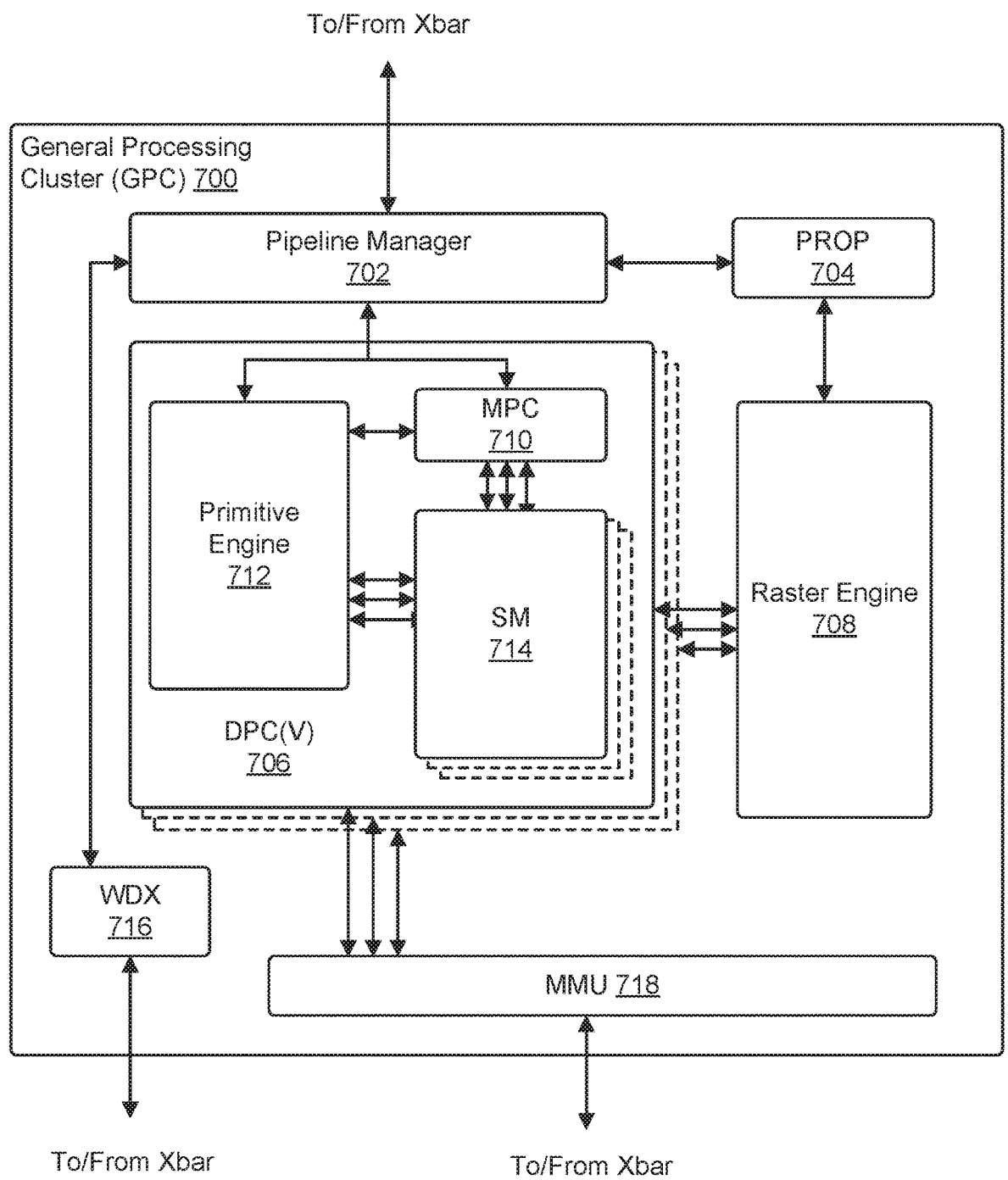
FIG. 7 illustrates an example of a general processing cluster ("GPC"), in accordance with one embodiment.

In an embodiment, the example process 400 is performed by a suitable computing device, including but not limited to the parallel processing unit depicted in FIG. 6, or the general processing cluster depicted in FIG. 7.

In an embodiment, at 402, an image for training the autoencoder is obtained and provided to the encoder. The image, which may be designated as $x_a$, has a known value for one or more properties of interest. For example, the image $x_a$ may have known values for gaze direction or head rotation. The obtained image $x_a$ is then encoded by the encoder portion of the autoencoder.

In an embodiment, at 404, output of the encoder is rotated by a determined amount r. The amount is proportional to a difference in the property of interest between the first image $x_a$ and a second image $x_b$. For example, if the gaze direction of a subject in $x_a$ is 45°, and the gaze direction in $x_b$ is 50°, then r may be equal to or otherwise proportional to 5°.

In an embodiment, at 406, the rotated output is decoded and a resultant image $\hat{x}$ is generated. The image $\hat{x}$ is based on one or more of such rotated outputs, and may also be based on additional output that is not rotated. For example, as depicted in FIG. 3, the decoder utilizes gaze direction and head rotation codes that are rotated, as well as an appearance code which is not subject to rotation.

In an embodiment, at 408, an image reconstructed based on the rotation and decoding is compared to the second image $x_b$. The second image is known to exhibit a change in the property of interest that is proportional to the amount of rotation in the latent space. For example, if a property of interest exhibited by $x_a$ is $p_a$, then in $x_b$, for the same property of interest, $p_b$=Kr, where r is the amount of rotation in the latent space and K is some constant.

In an embodiment, the output image $\hat{x}$ is compared to $x_b$ in order to generate an error signal. In an embodiment, at 410, the error signal generated by this comparison is used to train the autoencoder to generate variants of an input image in which the property of interest is changed by the rotation, but otherwise preserved. For example, once trained, the property of interest exhibited by the output image $\hat{x}$ should approximate $p_b$=Kr.

In an embodiment, both $x_a$ and $x_b$ could be synthetic data generated through a variety of possible techniques. In embodiments, an arbitrary number of synthetic images are generated.

In an embodiment, a subject-specific autoencoder is trained and used to generate labels to assign to the generated images. This may be used to address potential uncertainty in the estimation of the gaze angle for $x_a$ and $x_b$.

In an embodiment, the training of the autoencoder, as described in FIG. 4, is performed prior to few-shot training for a particular user. Once trained, the autoencoder may be used to generate images for training a neural network to solve a regression problem.

In an embodiment, the training of the autoencoder is performed using a relatively large dataset comprising samples for multiple individuals. The autoencoder may therefore be trained, in a general since, to generate embeddings in an equivariant latent space.

In an embodiment, training of the autoencoder is based at least in part on a clustering term. For example, a loss function for training the autoencoder might be defined as:

$$\text{Loss}=L_{recon}+L_{clustering}+L_{prop}$$

In the above embodiment of a loss function, $L_{recon}$ is the reconstruction loss and $L_{prop}$ is indicative of a loss in the property of interest. The term $L_{clustering}$ relates to the clustering of points for images of the same person.

Figure 5:
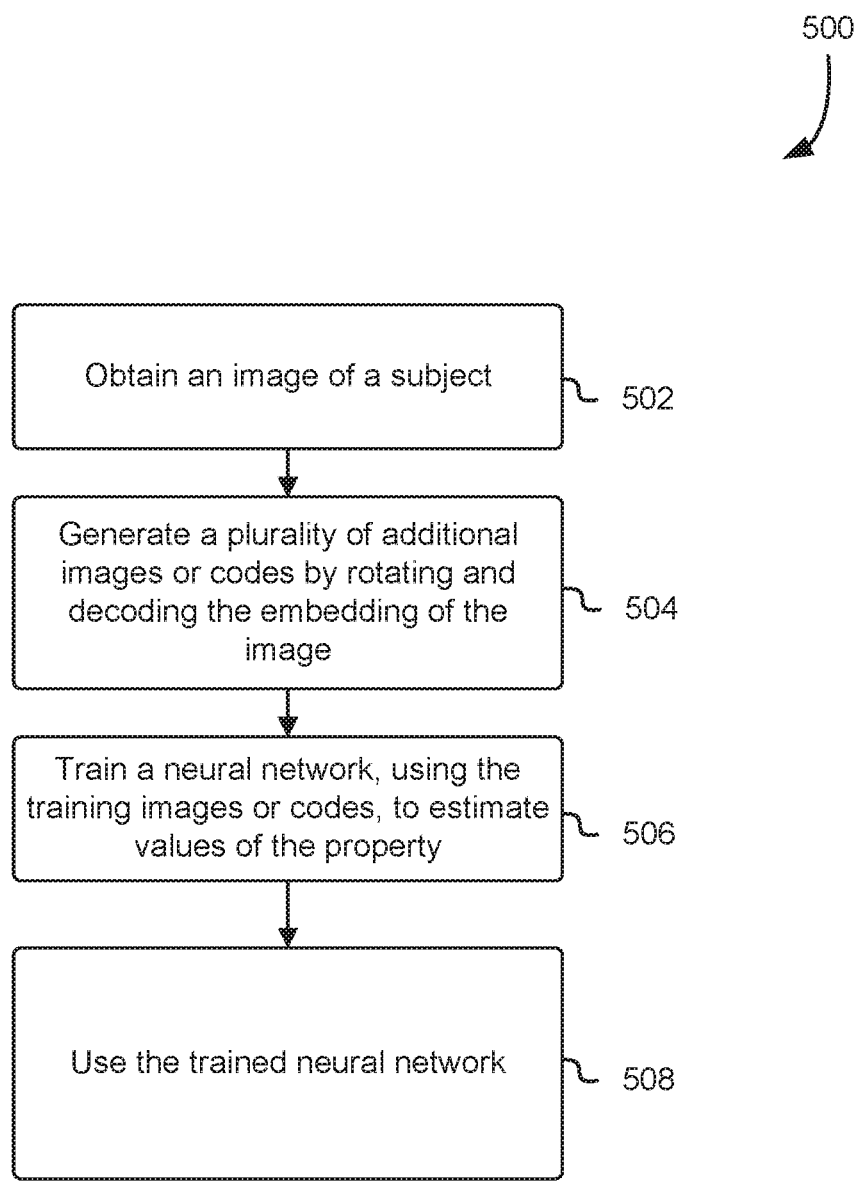
FIG. 5 illustrates an example process for few-shot training of a neural network to solve a regression problem, in accordance with an embodiment.

FIG. 5 illustrates an example process for few-shot training of a neural network to solve a regression problem, in accordance with an embodiment. Although depicted as a series of operation, the depicted order should not be construed so as to limit the scope of the present disclosure to only those embodiments which conform to the depicted order. For example, in certain cases, the depicted operations may be performed in an order that is different than what is depicted, or performed in parallel, except where the order may be logically required. In some embodiments, certain of the depicted operations may be omitted.

In an embodiment, the example process 500 is performed by a suitable computing device, including but not limited to the parallel processing unit depicted in FIG. 6, or the general processing cluster depicted in FIG. 7.

In an embodiment, at 502, an image of a subject is obtained. The image is obtained in a manner that permits labelling of the property of interest exhibit in the obtained image. For example, regarding eye gaze, an image might be obtained while the subject is directed to look at a specific location.

In an embodiment, at 504, a plurality of additional images or codes are generated based on the obtained image. The images or codes may be generated by taking the embeddings of the autoencoder and rotating them. For example, the obtained image is encoded by the encoder portion of the autoencoder, and then incrementally rotating them. The rotated codes may be used to train the network without generating a variant image, or may be decoded and used to generate the additional images. In these and other embodiments, the labelling of the generated images can derived from the labelling of the original image and the cumulative amount of rotation.

In an embodiment, the images, or codes, are generated to produce examples throughout the range of values to be estimated, based on the obtained image. Using gaze direction as an example, the original, real image might exhibit a gaze direction of 0°, and the hallucinated images, or latent codes, might be generated in 0.5° steps, resulting in hallucinated images exhibiting a range of gaze directions from 0.5°-89.5°. Additional real images might be obtained and used to generate hallucinated images for other ranges. The use of this approach may be determined experimentally, or determined in based on the available images.

In an embodiment, at 506, a neural network is trained to solve a regression problem, based at least in part on the codes derived from the rotation, or from images generated based on these codes. A wide variety of network architectures may be used, and a wide variety of training techniques, relying on the generated images, may be employed to train the network.

In an embodiment, at 508, the neural network is used to solve a regression problem.

In an embodiment, the regression problem includes estimation of the value related to a property, such as gaze direction or head rotation.

In an embodiment, the output of the neural network is back-propagated to the autoencoder, and used to refine the autoencoder's generation of images for training the neural network.

In an embodiment, a processor comprising one or more arithmetic logic units (ALUs) is configured to identify one or more features within an image based, at least in part, on one or more neural networks trained using encoded orientations of the one or more features. The identified features may comprise a numerical estimate calculated, by the one or more neural networks, as the solution to a regression problem. As used herein, an encoded orientation refers to an embedding in an equivariant latent space.

In an embodiment, the training of the one or more neural networks is done using images generated based on the encoded orientations of the one or more features, e.g., based on the embeddings in the equivariant latent space. The embeddings are done by a decoder which has been taught the equivariant latent space, by a process such as is described in relation to FIG. 4. A plurality of encoded orientations are generated, and images are generated based on rotating the embeddings and decoding them. When rotated by a determined amount in an equivariant latent space, the corresponding property of interest is preserved in the rotation. The resulting image therefore exhibits a value for the property that is changed, from prior to the rotation, in proportion to the amount of rotation in the latent space. Thus, an image generated based on the rotated embedding exhibits a change to at least one of the one or more features in proportion to the amount of rotation of the embedding.

In an embodiment, an autoencoder is trained to encode an image, wherein a second image generated by rotating and decoding the encoding of the image exhibits a value of a property, such as a gaze direction of a subject depicted in the image, which has changed in proportion to the amount of rotation. A method of using a neural network to solve a regression problem may comprise training the autoencoder in this fashion. The method further comprises using the autoencoder to generate a plurality of images based on a rotation of an encoding of an input image, and then using these images to train one or more neural networks to estimate a value of the property.

In an embodiment, the neural network regresses a differential from a reference image. For example, a neural network might be trained to estimate the difference between one or more properties as exhibited in a reference image compared to those properties in an input image.

In an embodiment, a processor is configured to estimate a property, based at least in part on one or more neural networks trained using images generated from an embedding of a first image, wherein a property of the first image, in a second image generated by a rotation and decoding of the embedding, is changed in proportion to the amount of rotation.

FIG. 6 illustrates a parallel processing unit ("PPU") 600, in accordance with one embodiment. In an embodiment, the PPU 600 is configured with machine-readable code that, if executed by the PPU, causes the PPU to perform some or all of processes and techniques described throughout this disclosure. In an embodiment, the PPU 600 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In an embodiment, a thread refers to a thread of execution and is an instantiation of a set of instructions configured to be executed by the PPU 600. In an embodiment, the PPU 600 is a graphics processing unit ("GPU") configured to implement a graphics rendering pipeline for processing three-dimensional ("3D") graphics data in order to generate two-dimensional ("2D") image data for display on a display device such as a liquid crystal display (LCD) device. In an embodiment, the PPU 600 is utilized to perform computations such as linear algebra operations and machine-learning operations. FIG. 6 illustrates an example parallel processor for illustrative purposes only and should be construed as a non-limiting example of processor architectures contemplated within the scope of this disclosure and that any suitable processor may be employed to supplement and/or substitute for the same.

In an embodiment, one or more PPUs are configured to accelerate High Performance Computing ("HPC"), data center, and machine learning applications. In an embodiment, the PPU 600 is configured to accelerate deep learning systems and applications including the following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In an embodiment, the PPU 600 includes an Input/Output ("I/O") unit 606, a front-end unit 610, a scheduler unit 612, a work distribution unit 614, a hub 616, a crossbar ("Xbar") 620, one or more general processing clusters ("GPCs") 618, and one or more partition units 622. In an embodiment, the PPU 600 is connected to a host processor or other PPUs 600 via one or more high-speed GPU interconnects 608. In an embodiment, the PPU 600 is connected to a host processor or other peripheral devices via an interconnect 602. In an embodiment, the PPU 600 is connected to a local memory comprising one or more memory devices 604. In an embodiment, the local memory comprises one or more dynamic random access memory ("DRAM") devices. In an embodiment, the one or more DRAM devices are configured and/or configurable as high-bandwidth memory ("HBM") subsystems, with multiple DRAM dies stacked within each device.

The high-speed GPU interconnect 608 may refer to a wire-based multi-lane communications link that is used by systems to scale and include one or more PPUs 600 combined with one or more CPUs, supports cache coherence between the PPUs 600 and CPUs, and CPU mastering. In an embodiment, data and/or commands are transmitted by the high-speed GPU interconnect 608 through the hub 616 to/from other units of the PPU 600 such as one or more copy engines, video encoders, video decoders, power management units, and other components which may not be explicitly illustrated in FIG. 6.

In an embodiment, the I/O unit 606 is configured to transmit and receive communications (e.g., commands, data) from a host processor (not illustrated in FIG. 6) over the system bus 602. In an embodiment, the I/O unit 606 communicates with the host processor directly via the system bus 602 or through one or more intermediate devices such as a memory bridge. In an embodiment, the I/O unit 606 may communicate with one or more other processors, such as one or more of the PPUs 600 via the system bus 602. In an embodiment, the I/O unit 606 implements a Peripheral Component Interconnect Express ("PCIe") interface for communications over a PCIe bus. In an embodiment, the I/O unit 606 implements interfaces for communicating with external devices.

In an embodiment, the I/O unit 606 decodes packets received via the system bus 602. In an embodiment, at least some packets represent commands configured to cause the PPU 600 to perform various operations. In an embodiment, the I/O unit 606 transmits the decoded commands to various other units of the PPU 600 as specified by the commands. In an embodiment, commands are transmitted to the front-end unit 610 and/or transmitted to the hub 616 or other units of the PPU 600 such as one or more copy engines, a video encoder, a video decoder, a power management unit, etc. (not explicitly illustrated in FIG. 6). In an embodiment, the I/O unit 606 is configured to route communications between and among the various logical units of the PPU 600.

In an embodiment, a program executed by the host processor encodes a command stream in a buffer that provides workloads to the PPU 600 for processing. In an embodiment, a workload comprises instructions and data to be processed by those instructions. In an embodiment, the buffer is a region in a memory that is accessible (e.g., read/write) by both the host processor and the PPU 600—the host interface unit may be configured to access the buffer in a system memory connected to the system bus 602 via memory requests transmitted over the system bus 602 by the I/O unit 606. In an embodiment, the host processor writes the command stream to the buffer and then transmits a pointer to the start of the command stream to the PPU 600 such that the front-end unit 610 receives pointers to one or more command streams and manages the one or more streams, reading commands from the streams and forwarding commands to the various units of the PPU 600.

In an embodiment, the front-end unit 610 is coupled to a scheduler unit 612 that configures the various GPCs 618 to process tasks defined by the one or more streams. In an embodiment, the scheduler unit 612 is configured to track state information related to the various tasks managed by the scheduler unit 612 where the state information may indicate which GPC 618 a task is assigned to, whether the task is active or inactive, a priority level associated with the task, and so forth. In an embodiment, the scheduler unit 612 manages the execution of a plurality of tasks on the one or more GPCs 618.

In an embodiment, the scheduler unit 612 is coupled to a work distribution unit 614 that is configured to dispatch tasks for execution on the GPCs 618. In an embodiment, the work distribution unit 614 tracks a number of scheduled tasks received from the scheduler unit 612 and the work distribution unit 614 manages a pending task pool and an active task pool for each of the GPCs 618. In an embodiment, the pending task pool comprises a number of slots (e.g., 32 slots) that contain tasks assigned to be processed by a particular GPC 618; the active task pool may comprise a number of slots (e.g., 4 slots) for tasks that are actively being processed by the GPCs 618 such that as a GPC 618 completes the execution of a task, that task is evicted from the active task pool for the GPC 618 and one of the other tasks from the pending task pool is selected and scheduled for execution on the GPC 618. In an embodiment, if an active task is idle on the GPC 618, such as while waiting for a data dependency to be resolved, then the active task is evicted from the GPC 618 and returned to the pending task pool while another task in the pending task pool is selected and scheduled for execution on the GPC 618.

In an embodiment, the work distribution unit 614 communicates with the one or more GPCs 618 via XBar 620. In an embodiment, the XBar 620 is an interconnect network that couples many of the units of the PPU 600 to other units of the PPU 600 and can be configured to couple the work distribution unit 614 to a particular GPC 618. Although not shown explicitly, one or more other units of the PPU 600 may also be connected to the XBar 620 via the hub 616.

The tasks are managed by the scheduler unit 612 and dispatched to a GPC 618 by the work distribution unit 614. The GPC 618 is configured to process the task and generate results. The results may be consumed by other tasks within the GPC 618, routed to a different GPC 618 via the XBar 620, or stored in the memory 604. The results can be written to the memory 604 via the partition units 622, which implement a memory interface for reading and writing data to/from the memory 604. The results can be transmitted to another PPU 604 or CPU via the high-speed GPU interconnect 608. In an embodiment, the PPU 600 includes a number U of partition units 622 that is equal to the number of separate and distinct memory devices 604 coupled to the PPU 600. A partition unit 622 will be described in more detail below in conjunction with FIG. 8.

In an embodiment, a host processor executes a driver kernel that implements an application programming interface ("API") that enables one or more applications executing on the host processor to schedule operations for execution on the PPU 600. In an embodiment, multiple compute applications are simultaneously executed by the PPU 600 and the PPU 600 provides isolation, quality of service ("QoS"), and independent address spaces for the multiple compute applications. In an embodiment, an application generates instructions (e.g., in the form of API calls) that cause the driver kernel to generate one or more tasks for execution by the PPU 600 and the driver kernel outputs tasks to one or more streams being processed by the PPU 600. In an embodiment, each task comprises one or more groups of related threads, which may be referred to as a warp. In an embodiment, a warp comprises a plurality of related threads (e.g., 32 threads) that can be executed in parallel. In an embodiment, cooperating threads can refer to a plurality of threads including instructions to perform the task and that exchange data through shared memory. Threads and cooperating threads are described in more detail, in accordance with one embodiment, in conjunction with FIG. 8A.

FIG. 7 illustrates a GPC 700 such as the GPC illustrated of the PPU 600 of FIG. 6, in accordance with one embodiment. In an embodiment, each GPC 700 includes a number of hardware units for processing tasks and each GPC 700 includes a pipeline manager 702, a pre-raster operations unit ("PROP") 704, a raster engine 708, a work distribution crossbar ("WDX") 716, a memory management unit ("MMU") 718, one or more Data Processing Clusters ("DPCs") 706, and any suitable combination of parts. It will be appreciated that the GPC 700 of FIG. 7 may include other hardware units in lieu of or in addition to the units shown in FIG. 7.

In an embodiment, the operation of the GPC 700 is controlled by the pipeline manager 702. The pipeline manager 702 manages the configuration of the one or more DPCs 706 for processing tasks allocated to the GPC 700. In an embodiment, the pipeline manager 702 configures at least one of the one or more DPCs 706 to implement at least a portion of a graphics rendering pipeline. In an embodiment, a DPC 706 is configured to execute a vertex shader program on the programmable streaming multiprocessor ("SM") 714. The pipeline manager 702 is configured to route packets received from a work distribution to the appropriate logical units within the GPC 700, in an embodiment, and some packets may be routed to fixed function hardware units in the PROP 704 and/or raster engine 708 while other packets may be routed to the DPCs 706 for processing by the primitive engine 712 or the SM 714. In an embodiment, the pipeline manager 702 configures at least one of the one or more DPCs 706 to implement a neural network model and/or a computing pipeline.

The PROP unit 704 is configured, in an embodiment, to route data generated by the raster engine 708 and the DPCs 706 to a Raster Operations ("ROP") unit in the memory partition unit, described in more detail above. In an embodiment, the PROP unit 704 is configured to perform optimizations for color blending, organize pixel data, perform address translations, and more. The raster engine 708 includes a number of fixed function hardware units configured to perform various raster operations, in an embodiment, and the raster engine 708 includes a setup engine, a coarse raster engine, a culling engine, a clipping engine, a fine raster engine, a tile coalescing engine, and any suitable combination thereof. The setup engine, in an embodiment, receives transformed vertices and generates plane equations associated with the geometric primitive defined by the vertices; the plane equations are transmitted to the coarse raster engine to generate coverage information (e.g., an x, y coverage mask for a tile) for the primitive; the output of the coarse raster engine is transmitted to the culling engine where fragments associated with the primitive that fail a z-test are culled, and transmitted to a clipping engine where fragments lying outside a viewing frustum are clipped. In an embodiment, the fragments that survive clipping and culling are passed to the fine raster engine to generate attributes for the pixel fragments based on the plane equations generated by the setup engine. In an embodiment, the output of the raster engine 708 comprises fragments to be processed by any suitable entity such as by a fragment shader implemented within a DPC 706.

In an embodiment, each DPC 706 included in the GPC 700 comprises an M-Pipe Controller ("MPC") 710; a primitive engine 712; one or more SMs 714; and any suitable combination thereof. In an embodiment, the MPC 710 controls the operation of the DPC 706, routing packets received from the pipeline manager 702 to the appropriate units in the DPC 706. In an embodiment, packets associated with a vertex are routed to the primitive engine 712, which is configured to fetch vertex attributes associated with the vertex from memory; in contrast, packets associated with a shader program may be transmitted to the SM 714.

In an embodiment, the SM 714 comprises a programmable streaming processor that is configured to process tasks represented by a number of threads. In an embodiment, the SM 714 is multi-threaded and configured to execute a plurality of threads (e.g., 32 threads) from a particular group of threads concurrently and implements a SIMD (Single-Instruction, Multiple-Data) architecture where each thread in a group of threads (e.g., a warp) is configured to process a different set of data based on the same set of instructions. In an embodiment, all threads in the group of threads execute the same instructions. In an embodiment, the SM 714 implements a SIMT (Single-Instruction, Multiple Thread) architecture wherein each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. In an embodiment, execution state is maintained for each individual thread and threads executing the same instructions may be converged and executed in parallel for better efficiency. In an embodiment, the SM 714 is described in more detail below.

In an embodiment, the MMU 718 provides an interface between the GPC 700 and the memory partition unit and the MMU 718 provides translation of virtual addresses into physical addresses, memory protection, and arbitration of memory requests. In an embodiment, the MMU 718 provides one or more translation lookaside buffers ("TLBs") for performing translation of virtual addresses into physical addresses in memory.

Figure 8:
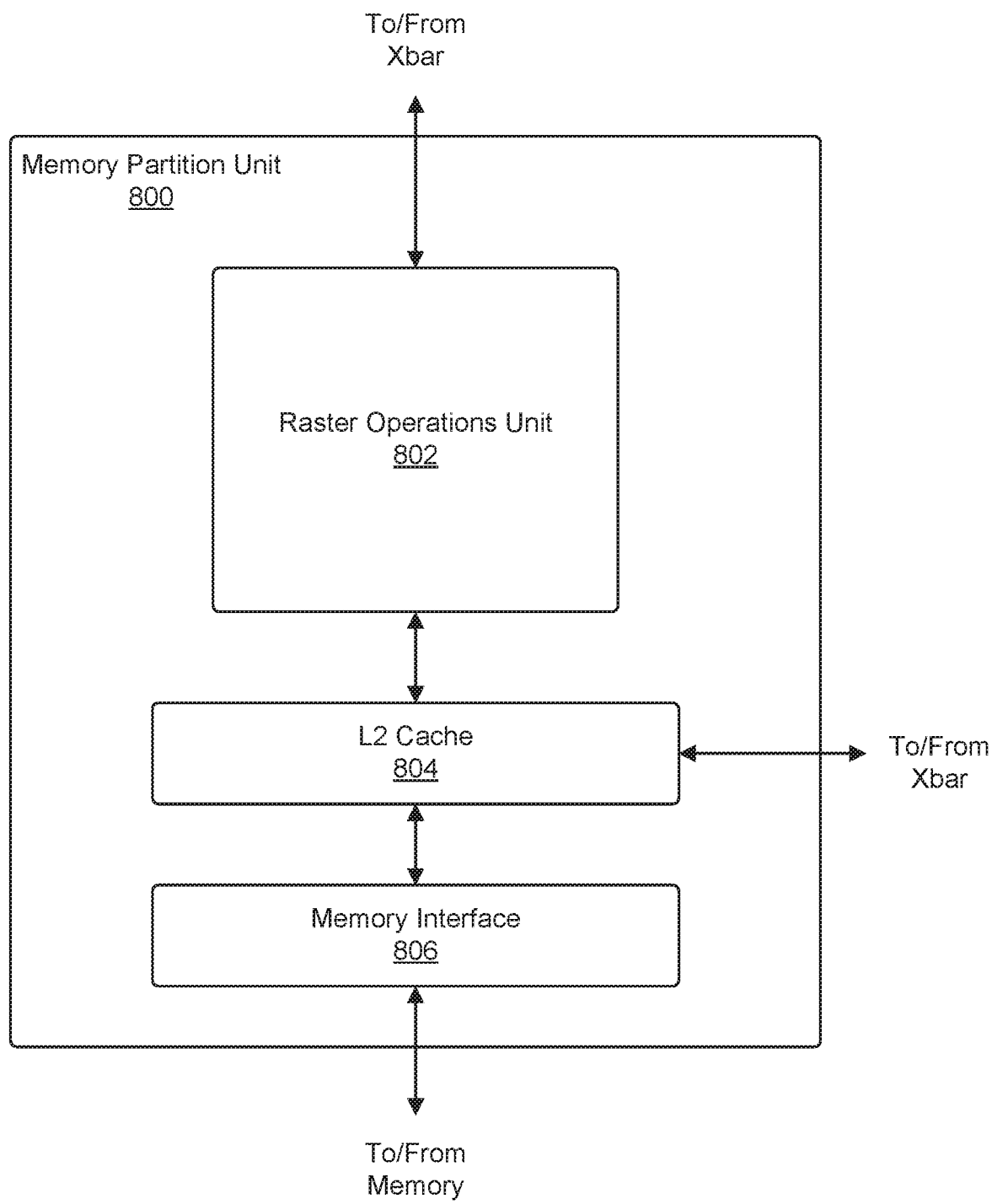
FIG. 8 illustrates an example of a memory partition unit, in accordance with one embodiment.

FIG. 8 illustrates a memory partition unit of a PPU, in accordance with one embodiment. In an embodiment, the memory partition unit 800 includes a Raster Operations ("ROP") unit 802; a level two ("L2") cache 804; a memory interface 806; and any suitable combination thereof. The memory interface 806 is coupled to the memory. Memory interface 806 may implement 32, 64, 128, 1024-bit data buses, or the like, for high-speed data transfer. In an embodiment, the PPU incorporates U memory interfaces 806, one memory interface 806 per pair of partition units 800, where each pair of partition units 800 is connected to a corresponding memory device. For example, PPU may be connected to up to Y memory devices, such as high bandwidth memory stacks or graphics double-data-rate, version 5, synchronous dynamic random access memory ("GDDR5 SDRAM").

In an embodiment, the memory interface 806 implements an HBM2 memory interface and Y equals half U. In an embodiment, the HBM2 memory stacks are located on the same physical package as the PPU, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory supports Single-Error Correcting Double-Error Detecting ("SECDED") Error Correction Code ("ECC") to protect data. ECC provides higher reliability for compute applications that are sensitive to data corruption. Reliability is especially important in large-scale cluster computing environments where PPUs process very large datasets and/or run applications for extended periods.

In an embodiment, the PPU implements a multi-level memory hierarchy. In an embodiment, the memory partition unit 800 supports a unified memory to provide a single unified virtual address space for CPU and PPU memory, enabling data sharing between virtual memory systems. In an embodiment the frequency of accesses by a PPU to memory located on other processors is trace to ensure that memory pages are moved to the physical memory of the PPU that is accessing the pages more frequently. In an embodiment, the high-speed GPU interconnect 608 supports address translation services allowing the PPU to directly access a CPU's page tables and providing full access to CPU memory by the PPU.

In an embodiment, copy engines transfer data between multiple PPUs or between PPUs and CPUs. In an embodiment, the copy engines can generate page faults for addresses that are not mapped into the page tables and the memory partition unit 800 then services the page faults, mapping the addresses into the page table, after which the copy engine performs the transfer. In an embodiment, memory is pinned (i.e., non-pageable) for multiple copy engine operations between multiple processors, substantially reducing the available memory. In an embodiment, with hardware page faulting, addresses can be passed to the copy engines without regard as to whether the memory pages are resident, and the copy process is transparent.

Data from the memory of FIG. 6 or other system memory is fetched by the memory partition unit 800 and stored in the L2 cache 804, which is located on-chip and is shared between the various GPCs, in accordance with one embodiment. Each memory partition unit 800, in an embodiment, includes at least a portion of the L2 cache 804 associated with a corresponding memory device. In an embodiment, lower level caches are implemented in various units within the GPCs. In an embodiment, each of the SMs 714 may implement a level one ("L1") cache wherein the L1 cache is private memory that is dedicated to a particular SM 840 and data from the L2 cache 804 is fetched and stored in each of the L1 caches for processing in the functional units of the SMs 714. In an embodiment, the L2 cache 804 is coupled to the memory interface 806 and the XBar 620.

The ROP unit 802 performs graphics raster operations related to pixel color, such as color compression, pixel blending, and more, in an embodiment. The ROP unit 802, in an embodiment, implements depth testing in conjunction with the raster engine 708, receiving a depth for a sample location associated with a pixel fragment from the culling engine of the raster engine 708. In an embodiment, the depth is tested against a corresponding depth in a depth buffer for a sample location associated with the fragment. In an embodiment, if the fragment passes the depth test for the sample location, then the ROP unit 802 updates the depth buffer and transmits a result of the depth test to the raster engine 708. It will be appreciated that the number of partition units 800 may be different than the number of GPCs and, therefore, each ROP unit 802 can, in an embodiment, be coupled to each of the GPCs. In an embodiment, the ROP unit 802 tracks packets received from the different GPCs and determines which that a result generated by the ROP unit 802 is routed to through the Xbar.

Figure 9:
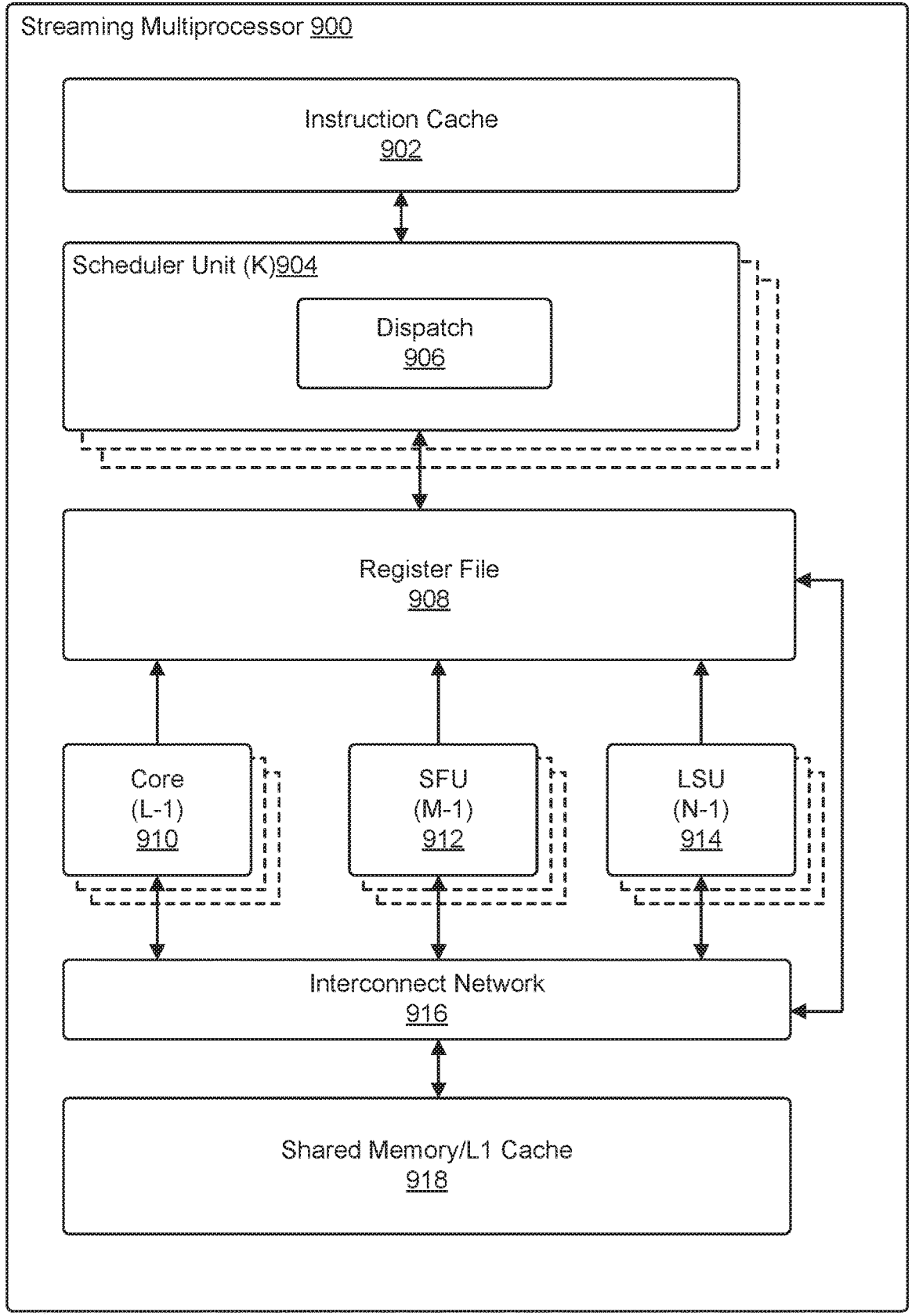
FIG. 9 illustrates an example of a streaming multiprocessor, in accordance with one embodiment.

FIG. 9 illustrates a streaming multiprocessor such as the streaming multiprocessor of FIG. 7, in accordance with one embodiment. In an embodiment, the SM 900 includes: an instruction cache 902; one or more scheduler units 904; a register file 908; one or more processing cores 910; one or more special function units ("SFUs") 912; one or more load/store units ("LSUs") 914; an interconnect network 916; a shared memory/L1 cache 918; and any suitable combination thereof. In an embodiment, the work distribution unit dispatches tasks for execution on the GPCs of the PPU and each task is allocated to a particular DPC within a GPC and, if the task is associated with a shader program, the task is allocated to an SM 900. In an embodiment, the scheduler unit 904 receives the tasks from the work distribution unit and manages instruction scheduling for one or more thread blocks assigned to the SM 900. In an embodiment, the scheduler unit 904 schedules thread blocks for execution as warps of parallel threads, wherein each thread block is allocated at least one warp. In an embodiment, each warp executes threads. In an embodiment, the scheduler unit 904 manages a plurality of different thread blocks, allocating the warps to the different thread blocks and then dispatching instructions from the plurality of different cooperative groups to the various functional units (e.g., cores 910, SFUs 912, and LSUs 914) during each clock cycle.

Cooperative Groups may refer to a programming model for organizing groups of communicating threads that allows developers to express the granularity at which threads are communicating, enabling the expression of richer, more efficient parallel decompositions. In an embodiment, cooperative launch APIs support synchronization amongst thread blocks for the execution of parallel algorithms. In an embodiment, applications of conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces. Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

In an embodiment, a dispatch unit 906 is configured to transmit instructions to one or more of the functional units and the scheduler unit 904 includes two dispatch units 906 that enable two different instructions from the same warp to be dispatched during each clock cycle. In an embodiment, each scheduler unit 904 includes a single dispatch unit 906 or additional dispatch units 906.

Each SM 900, in an embodiment, includes a register file 908 that provides a set of registers for the functional units of the SM 900. In an embodiment, the register file 908 is divided between each of the functional units such that each functional unit is allocated a dedicated portion of the register file 908. In an embodiment, the register file 908 is divided between the different warps being executed by the SM 900 and the register file 908 provides temporary storage for operands connected to the data paths of the functional units. In an embodiment, each SM 900 comprises a plurality of L processing cores 910. In an embodiment, the SM 900 includes a large number (e.g., 128 or more) of distinct processing cores 910. Each core 910, in an embodiment, includes a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 910 include 64 single-precision (32-bit) floating point cores, 64 integer cores, 32 double-precision (64-bit) floating point cores, and 8 tensor cores.

Tensor cores are configured to perform matrix operations in accordance with an embodiment. In an embodiment, one or more tensor cores are included in the cores 910. In an embodiment, the tensor cores are configured to perform deep learning matrix arithmetic, such as convolution operations for neural network training and inferencing. In an embodiment, each tensor core operates on a 4×4 matrix and performs a matrix multiply and accumulate operation D=A× B+C, where A, B, C, and D are 4×4 matrices.

In an embodiment, the matrix multiply inputs A and B are 16-bit floating point matrices and the accumulation matrices C and D are 16-bit floating point or 32-bit floating point matrices. In an embodiment, the tensor cores operate on 16-bit floating point input data with 32-bit floating point accumulation. In an embodiment, the 16-bit floating point multiply requires 64 operations and results in a full precision product that is then accumulated using 32-bit floating point addition with the other intermediate products for a 4×4×4 matrix multiply. Tensor cores are used to perform much larger two-dimensional or higher dimensional matrix operations, built up from these smaller elements, in an embodiment. In an embodiment, an API, such as CUDA 9 C++ API, exposes specialized matrix load, matrix multiply and accumulate, and matrix store operations to efficiently use tensor cores from a CUDA-C++ program. In an embodiment, at the CUDA level, the warp-level interface assumes 16×16 size matrices spanning all 32 threads of the warp.

In an embodiment, each SM 900 comprises M SFUs 912 that perform special functions (e.g., attribute evaluation, reciprocal square root, and the like). In an embodiment, the SFUs 912 include a tree traversal unit configured to traverse a hierarchical tree data structure. In an embodiment, the SFUs 912 include texture unit configured to perform texture map filtering operations. In an embodiment, the texture units are configured to load texture maps (e.g., a 2D array of texels) from the memory and sample the texture maps to produce sampled texture values for use in shader programs executed by the SM 900. In an embodiment, the texture maps are stored in the shared memory/L1 cache. The texture units implement texture operations such as filtering operations using mip-maps (e.g., texture maps of varying levels of detail), in accordance with one embodiment. In an embodiment, each SM 900 includes two texture units.

Each SM 900 comprises N LSUs 914 that implement load and store operations between the shared memory/L1 cache 918 and the register file 908, in an embodiment. Each SM 900 includes an interconnect network 916 that connects each of the functional units to the register file 908 and the LSU 914 to the register file 908, shared memory/L1 cache 918 in an embodiment. In an embodiment, the interconnect network 916 is a crossbar that can be configured to connect any of the functional units to any of the registers in the register file 908 and connect the LSUs 914 to the register file and memory locations in shared memory/L1 cache 918.

The shared memory/L1 cache 918 is an array of on-chip memory that allows for data storage and communication between the SM 900 and the primitive engine and between threads in the SM 900 in an embodiment. In an embodiment, the shared memory/L1 cache 918 comprises 128 KB of storage capacity and is in the path from the SM 900 to the partition unit. The shared memory/L1 cache 918, in an embodiment, is used to cache reads and writes. One or more of the shared memory/L1 cache 918, L2 cache, and memory are backing stores.

Combining data cache and shared memory functionality into a single memory block provides improved performance for both types of memory accesses, in an embodiment. The capacity, in an embodiment, is used or is usable as a cache by programs that do not use shared memory, such as if shared memory is configured to use half of the capacity, texture and load/store operations can use the remaining capacity. Integration within the shared memory/L1 cache 918 enables the shared memory/L1 cache 918 to function as a high-throughput conduit for streaming data while simultaneously providing high-bandwidth and low-latency access to frequently reused data, in accordance with an embodiment. When configured for general purpose parallel computation, a simpler configuration can be used compared with graphics processing. In an embodiment, fixed function graphics processing units are bypassed, creating a much simpler programming model. In the general purpose parallel computation configuration, the work distribution unit assigns and distributes blocks of threads directly to the DPCs, in an embodiment. The threads in a block execute the same program, using a unique thread ID in the calculation to ensure each thread generates unique results, using the SM 900 to execute the program and perform calculations, shared memory/L1 cache 918 to communicate between threads, and the LSU 914 to read and write global memory through the shared memory/L1 cache 918 and the memory partition unit, in accordance with one embodiment. In an embodiment, when configured for general purpose parallel computation, the SM 900 writes commands that the scheduler unit can use to launch new work on the DPCs.

In an embodiment, the PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In an embodiment, the PPU is embodied on a single semiconductor substrate. In an embodiment, the PPU is included in a system-on-a-chip ("SoC") along with one or more other devices such as additional PPUs, the memory, a reduced instruction set computer ("RISC") CPU, a memory management unit ("MMU"), a digital-to-analog converter ("DAC"), and the like.

In an embodiment, the PPU may be included on a graphics card that includes one or more memory devices. The graphics card may be configured to interface with a PCIe slot on a motherboard of a desktop computer. In yet another embodiment, the PPU may be an integrate graphics processing unit ("iGPU") included in the chipset of the motherboard.

Figure 10:
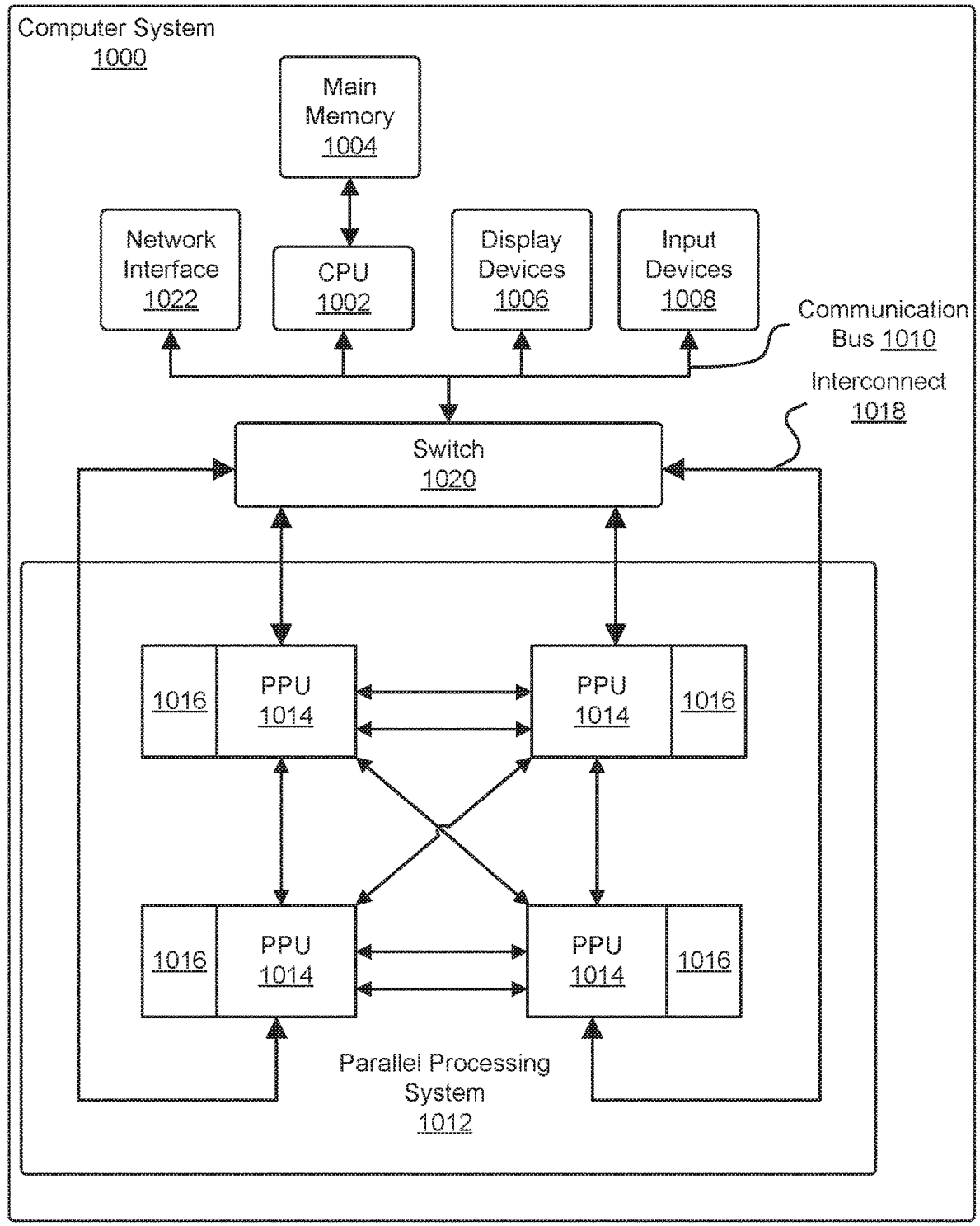
FIG. 10 illustrates a computer system in which the various examples can be implemented, in accordance with one embodiment.

FIG. 10 illustrates a computer system 1000 in which the various architecture and/or functionality can be implemented, in accordance with one embodiment. The computer system 1000, in an embodiment, is configured to implement various processes and methods described throughout this disclosure.

In an embodiment, the computer system 1000 comprises at least one central processing unit 1002 that is connected to a communication bus 1010 implemented using any suitable protocol, such as PCI (Peripheral Component Interconnect), PCI-Express, AGP (Accelerated Graphics Port), Hyper-Transport, or any other bus or point-to-point communication protocol(s). In an embodiment, the computer system 1000 includes a main memory 1004 and control logic (e.g., implemented as hardware, software, or a combination thereof) and data are stored in the main memory 1004 which may take the form of random access memory ("RAM"). In an embodiment, a network interface subsystem 1022 provides an interface to other computing devices and networks for receiving data from and transmitting data to other systems from the computer system 1000.

The computer system 1000, in an embodiment, includes input devices 1008, the parallel processing system 1012, and display devices 1006 which can be implemented using a conventional CRT (cathode ray tube), LCD (liquid crystal display), LED (light emitting diode), plasma display, or other suitable display technologies. In an embodiment, user input is received from input devices 1008 such as keyboard, mouse, touchpad, microphone, and more. In an embodiment, each of the foregoing modules can be situated on a single semiconductor platform to form a processing system.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit ("CPU") and bus implementation. Of course, the various modules may also be situated separately or in various combinations of semiconductor platforms per the desires of the user.

In an embodiment, computer programs in the form of machine-readable executable code or computer control logic algorithms are stored in the main memory 1004 and/or secondary storage. Computer programs, if executed by one or more processors, enable the system 1000 to perform various functions in accordance with one embodiment. The memory 1004, the storage, and/or any other storage are possible examples of computer-readable media. Secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory.

In an embodiment, the architecture and/or functionality of the various previous figures are implemented in the context of the central processor 1002; parallel processing system 1012; an integrated circuit capable of at least a portion of the capabilities of both the central processor 1002; the parallel processing system 1012; a chipset (e.g., a group of integrated circuits designed to work and sold as a unit for performing related functions, etc.); and any suitable combination of integrated circuit.

In an embodiment, the architecture and/or functionality of the various previous figures is be implemented in the context of a general computer system, a circuit board system, a game console system dedicated for entertainment purposes, an application-specific system, and more. In an embodiment, the computer system 1000 may take the form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In an embodiment, a parallel processing system 1012 includes a plurality of PPUs 1014 and associated memories 1016. In an embodiment, the PPUs are connected to a host processor or other peripheral devices via an interconnect 1018 and a switch 1020 or multiplexer. In an embodiment, the parallel processing system 1012 distributes computational tasks across the PPUs 1014 which can be parallelizable—for example, as part of the distribution of computational tasks across multiple GPU thread blocks. In an embodiment, memory is shared and accessible (e.g., for read and/or write access) across some or all of the PPUs 1014, although such shared memory may incur performance penalties relative to the use of local memory and registers resident to a PPU. In an embodiment, the operation of the PPUs 1014 is synchronized through the use of a command such as syncthreads( ) which requires all threads in a block (e.g., executed across multiple PPUs 1014) to reach a certain point of execution of code before proceeding.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer system comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered a system.

In the present document, references may be made to obtaining, acquiring, receiving, or inputting analog or digital data into a subsystem, computer system, or computer-implemented machine. The process of obtaining, acquiring, receiving, or inputting analog and digital data can be accomplished in a variety of ways such as by receiving the data as a parameter of a function call or a call to an application programming interface. In some implementations, the process of obtaining, acquiring, receiving, or inputting analog or digital data can be accomplished by transferring the data via a serial or parallel interface. In another implementation, the process of obtaining, acquiring, receiving, or inputting analog or digital data can be accomplished by transferring the data via a computer network from the providing entity to the acquiring entity. References may also be made to providing, outputting, transmitting, sending, or presenting analog or digital data. In various examples, the process of providing, outputting, transmitting, sending, or presenting analog or digital data can be accomplished by transferring the data as an input or output parameter of a function call, a parameter of an application programming interface or interprocess communication mechanism.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A processor comprising:
one or more arithmetic logic units (ALUs) to identify one or more features within an image based, at least in part, on one or more neural networks trained using one or more encoded orientations of the one or more features.

2. The processor of claim 1, wherein identification of the one or more features comprises forming a numerical estimate.

3. The processor of claim 1, wherein the one or more encoded orientations are used to generate images for training the one or more neural networks.

4. The processor of claim 1, wherein the encoded orientations are generated based at least in part rotating an embedding by an amount.

5. The processor of claim 4, wherein an image generated based on the rotated embedding exhibits a change to at least one of the one or more features in proportion to the amount of rotation of the embedding.

6. The processor of claim 1, wherein encoded orientations are generated based at least in part on an encoder trained to map input to points in an equivariant latent space.

7. A system comprising:
one or more computers including one or more processors to train one or more neural networks to identify one or more features within an image, the one or more neural networks trained using one or more encoded orientations of the one or more features.

8. The system of claim 7, wherein identification of the one or more features comprises forming a numerical estimate.

9. The system of claim 7, wherein the one or more encoded orientations are one or more embeddings in a latent space that can be rotated while preserving a property of interest.

10. The system of claim 7, wherein the encoded orientations are generated based at least in part on rotating an embedding by an amount.

11. The system of claim 10, wherein an image generated based on the rotated embedding exhibits a change to at least one of the one or more features in proportion to the amount of rotation of the embedding.

12. The system of claim 7, wherein encoded orientations are generated based at least in part on an encoder trained to embed input to an equivariant latent space.

13. The system of claim 12, wherein the encoder is trained based, at least in part, on comparing a first image predicted to exhibit a value of at least one of the one or more features to a second image known to exhibit the value, wherein the first image is generated by rotating and decoding an embedding in the latent space.

14. A machine-readable medium having stored thereon a set of instructions, which if performed by one or more processors, cause the one or more processors to at least:
cause one or more neural networks to be trained to identify one or more features within an image, the one or more neural networks trained using one or more encoded orientations of the one or more features.

15. The machine-readable medium of claim 14, wherein identifying the one or more features comprises forming a numerical estimate.

16. The machine-readable medium of claim 14, wherein the one or more encoded orientations are embeddings in a rotatable latent space.

17. The machine-readable medium of claim 14, wherein the encoded orientations are generated based at least in part on rotating an embedding by an amount.

18. The machine-readable medium of claim 14, wherein an image is generated to train the one or more neural networks based at least in part on rotation of the encoded orientations to change an orientation of the one or more features in proportion to the amount of rotation.

19. The machine-readable medium of claim 14, wherein encoded orientations are generated based at least in part on an encoder trained to embed input to a latent space, wherein the latent space preserves a property of interest when rotated.

20. The machine-readable medium of claim 19, wherein the encoder is trained based, at least in part, on a first image predicted to exhibit a value of at least one of the one or more features to a second image known to exhibit the value, wherein the first image is generated by rotating and decoding an embedding in the latent space.

21. A system comprising:
a camera; and
a processor to identify a view direction of a subject depicted in an image obtained by the camera, the gaze direction identified based, at least in part, on one or more neural networks trained using one or more encoded orientations of the view direction.

22. The system of claim 21, wherein encoded orientations comprise a three-dimensional code indicative of gaze direction.

23. The system of claim 21, wherein encoded orientations comprise a three-dimensional code indicative of head rotation.

24. The system of claim 21, wherein the one or more encoded orientations are used to generate images for training the one or more neural networks.

25. The system of claim 24, wherein the encoded orientations are generated by rotating at least one of a gaze direction code or a head rotation code.

26. The system of claim 25, wherein the one or more neural networks are trained based at least in part on images generated by decoding the encoded orientations.

27. The system of claim 21, wherein the one or more neural networks are trained to solve a regression of the view direction.

28. The processor of claim 1, wherein the neural network is trained to identify the one or more features within the image based, at least in part, on one or more images generated by rotating the encoded orientations.

29. The processor of claim 1, wherein the one or more encoded orientations are generated by an encoder.

* * * * *